United States Patent [19]

Atkinson et al.

[11] 3,808,830

[45] May 7, 1974

[54] THERMALLY ACTUATED SUCTION THROTTLING VALVE

[75] Inventors: Ward J. Atkinson, Northville; Richard C. Kozinski, Warren, both of Mich.

[73] Assignee: General Motors Corporation, Detroit, Mich.

[22] Filed: Apr. 16, 1973

[21] Appl. No.: 351,769

[52] U.S. Cl. ............................................. 62/217
[51] Int. Cl. ............................................. F25b 41/04
[58] Field of Search ...................................... 62/217

[56] References Cited
UNITED STATES PATENTS

| 1,990,663 | 2/1935 | Muffly | 62/217 |
| 2,071,935 | 2/1937 | Muffly | 62/217 |

Primary Examiner—Meyer Perlin
Attorney, Agent, or Firm—K. H. MacLean, Jr.

[57] ABSTRACT

A freeze actuated suction throttling valve for use in an automobile air conditioning system between the evaporator and the compressor to maintain refrigerant temperature within the evaporator above a temperature which will cause the evaporator to accumulate frost on its exterior surfaces. The throttling valve includes a valve member upstream from a valve seat which is movable toward a closed position by an actuator also upstream from the valve seat. The actuator includes a rigid cup-shaped member filled with water and having a flexible diaphragm covering its one end. When the water freezes, the resulting expansion distorts the flexible diaphragm and moves the valve member toward a closed position.

3 Claims, 3 Drawing Figures

PATENTED MAY 7 1974 3,808,830

THERMALLY ACTUATED SUCTION THROTTLING VALVE

This invention relates to an improved automobile air conditioning system and more specifically to an improved freeze actuated throttling valve for the air conditioning system.

In modern automotive air conditioning systems, the compressor driven by an internal combustion engine whose rotational speed varies widely. The pumping capacity of the compressor varies in proportion to the changes in engine speed. The compressor's output directly effects the cooling operation of the evaporator because its cooling capacity at any given ambient temperature is limited. Unfortunately, changes in compressor capacity cannot be conveniently regulated to correspond to the cooling capacity of the evaporator. Thus under some operating conditions, compressor capacity may greatly exceed the capacity of the evaporator to extract heat from air and to vaporize refrigerant. When this happens, refrigerant pressure within the evaporator decreases due to greater flow of refrigerant from the evaporator to the compressor and may fall much below a pressure corresponding to freezing. When the exterior fin surfaces of the evaporator drop to below 32°F., an accumulation of frost on the fin will most likely occur. This is undesirable because frost accumulation decreases the heat transfer rate and will block air flow when an appreciable amount builds up. Thus it is desirable to provide means which prevents the refrigerant pressure and temperature within the evaporator from falling below a value corresponding to freezing temperatures on the exterior surfaces of the evaporator.

The subject air conditioning system includes a throttling valve located between the evaporator and the compressor inlet which under conditions of high compressor capacity and relatively low heat load on the evaporator tends to close and restrict the flow of refrigerant from the evaporator to the compressor. This restriction causes refrigerant to back up or remain in the evaporator to prevent its pressure and temperature from producing freezing temperatures. Previously used suction throttling valves have utilized evacuated bellows which sense the pressure of refrigerant in the evaporator. Others use external sensors on the evaporator to sense a frost build up.

The subject throttling valve is a compact device consisting of a valve member within a casing which is moved against a spring toward a valve seat by water as it expands during freezing. More specifically, a valve actuator is located in continuous fluid contact with refrigerant from the evaporator. It includes a rigid casing whose interior is filled with water and one end of which is covered by a resilient member which is distorted by the expansion of freezing water within the actuator. This distortion is transmitted to the valve to move the valve toward a close position as the water in the actuator expands.

Therefore, an object of the present invention is to provide an improved air conditioning system having a simple and inexpensive throttling valve including a water filled actuator to sense refrigerant temperature and move a valve toward closed position restricting the flow of refrigerant from the evaporator to the compressor when the water expands due to freezing.

A further object of the invention is to provide a simple and inexpensive throttling valve for an automobile air conditioning system which has relatively few parts and includes a valve member movable against a valve seat to restrict refrigerant flow from the evaporator to the compressor in response to movement caused by the expansive action of water enclosed in the rigid casing.

Further objects and advantages of the present invention will be readily apparent from the following detailed description with reference being had to the accompanying drawings in which a preferred embodiment of the invention is clearly illustrated.

Figure 1:
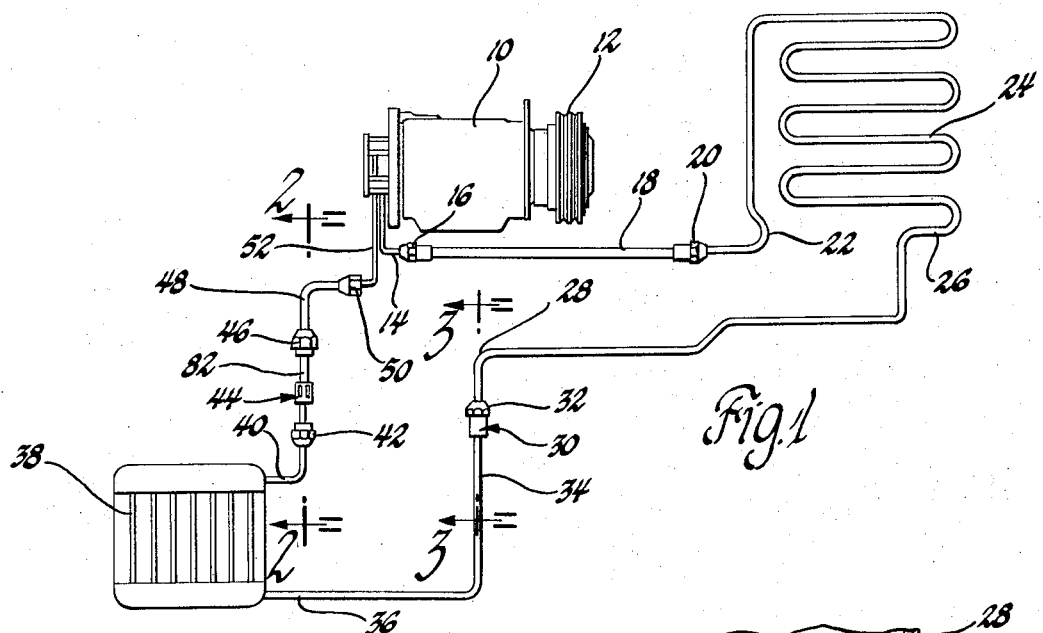
FIG. 1 is a schematic view of an automobile air conditioning system including the present invention.

In FIG. 1 of the drawings, an automobile air conditioning system is illustrated. A refrigerant compressor 10 is illustrated having a pulley assembly 12 attached to one end of a drive shaft which extends from the body of the compressor. The pulley assembly 12 is adapted to be connected by a belt drive to the internal combustion engine of a vehicle for rotating the compressor. The outlet of compressor 10 includes a tube or conduit 14 which extends from the end of the compressor and is attached by fitting 16 to a high pressure flexible hose 18. Hose 18 is in turn connected by fitting 20 to the inlet 22 of a condenser 24. Condenser 24 is normally located in the front portion of the vehicle's engine compartment to receive air flowing through the grill.

Compressed refrigerant from the compressor 10 is cooled and liquified in the condenser 24. The outlet 26 of the condenser 24 is connected to an inlet 28 of expansion means 30 by fitting 32. The expansion means 30 is shown in more detail in FIG. 3. Its function is to expand high pressure refrigerant received from the condenser to a lower pressure. The outlet 34 of the expansion means 30 is connected to an inlet 36 of an evaporator 38. The low pressure and liquid refrigerant is vaporized in the evaporator 38 as heat is absorbed from air passing over the evaporator's exterior surfaces. The refrigerant is discharged from the evaporator 38 through an outlet 40 which is connected by a fitting 42 to a freeze actuated throttling valve 44. The outlet of the throttling valve in turn is connected by fitting 46, tube 48 and fitting 50 to the inlet 52 of the compressor 10 to complete the fluid circuit. Its function is to maintain refrigerant pressure above a predetermined value to prevent frost accumulation on the evaporator.

Figure 3:
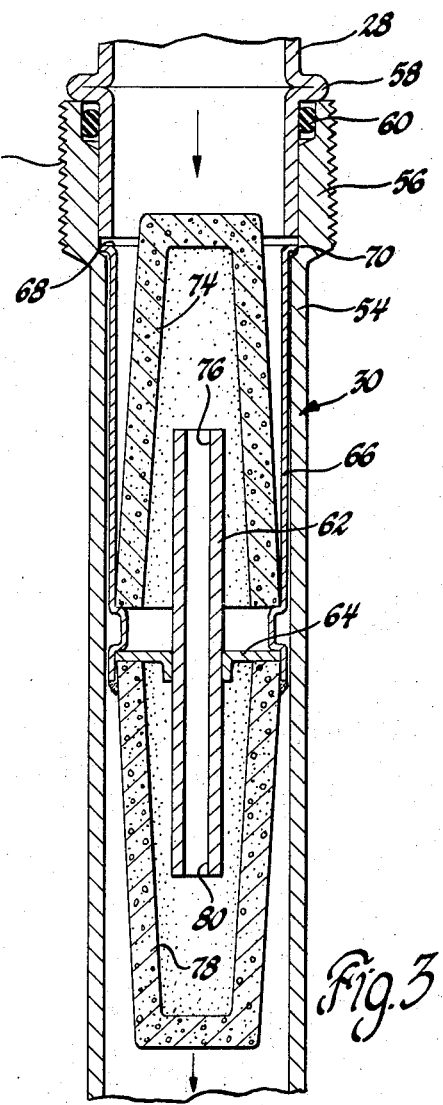
FIG. 3 is a sectioned view of the expansion device taken along section line 3—3 in FIG. 1 and looking in the direction of the arrows.

The expansion valve means 30 which is shown in FIG. 3 includes an outer tubular member 54 having an enlarged inner diameter end 56. The inlet tube 28 from condenser 24 is adapted to be inserted into the enlarged diameter end 56 of the expansion means 30. A crimped portion 58 in the tube 28 limits its insertion into the tubular member 54. An O-ring 60 prevents refrigerant leakage between inlet 28 and the member 54.

An orifice tube type expander is positioned within the tubular member 54 and includes a short length, small diameter orifice tube 62 through which refrigerant flows from the condenser to the evaporator. Refrigerant pressure is reduced by passage through the orifice tube. The tube 62 is supported at about its mid-portion by a collar 64 which is engaged at its outer edge by a tubular member 66. The tubular member 66 has a spun over end flange 68 adapted to engage shoulder 70 which is formed by the enlarged diameter end portion 56 to axially hold the orifice tube assembly within the tubular member 54. The threaded outer portion 72 on tubular member 54 is adapted to engage fitting 32 shown in FIG. 1 to hold inlet 28 to the expander 30.

The orifice tube itself is a small inside diameter tubular member which can be easily blocked if foreign material carried by the refrigerant lodges in its passage. To prevent blocking of the orifice tube, a sintered metal strainer 74 is supported by the tubular member 66 around the inlet end 76 of orifice 62.

Capillary type expansion means such as shown in FIG. 3 produce an unpleasant hissing noise when the compressor is shut down. This is caused by the rapid passage of high pressure vaporous refrigerant formed in the condenser and passes through the orifice tube. To muffle this hissing noise, a sintered metal muffler 78 is supported by tubular member 66 about the outlet end 80 of the orifice tube 62.

Figure 2:
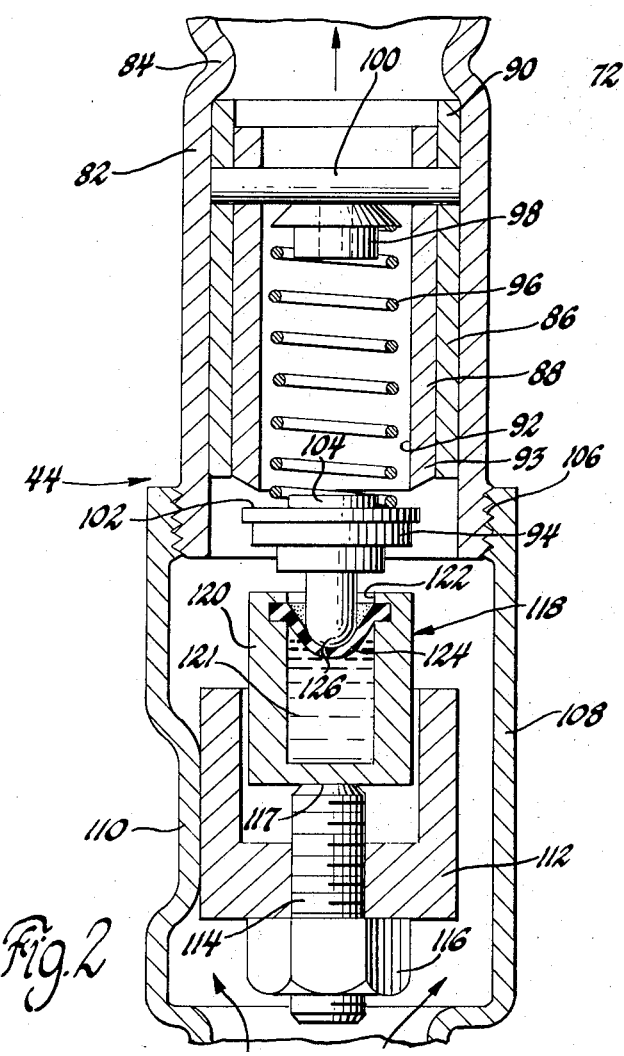
FIG. 2 is a sectioned view of the subject throttling valve taken along section line 2—2 in FIG. 1 and looking in the direction of the arrows.

As previously explained, the refrigerant temperature in the evaporator may approach a value which corresponds to a freezing temperature for water upon the exterior surfaces of the evaporator. This occurs when the pumping capacity of the compressor exceeds the cooling capacity of the evaporator. To prevent the temperature from decreasing below predetermined limits, the subject throttling valve 44 shown in FIG. 2 is provided. The throttling valve 44 includes a tubular outlet member 82 having a crimped annular portion 84. Concentric tubular members 86 and 88 are pressed into the outlet tube 82 until the end 90 of the member 86 engages the crimped portion 84. The inner diameter 92 of tubular member 88 forms a refrigerant passage from the evaporator to the compressor.

The end 93 of member 88 which is closest to the evaporator is beveled to form a valve seat for valve member 94. Valve 94 is normally spaced a predetermined distance from the valve seat 93 by a coil spring 96. The spring 96 presses against a retainer 98 downstream from valve member 94. Retainer 98 in turn is retained by a pin 100 whose ends are supported by the tubular members 86 and 88. The other end of spring 96 engages a face 102 of valve member 94. A raised portion 104 on the face 102 centers spring 96 with respect to the valve element 94.

The outlet portion 82 is threadably secured at 106 to a tubular inlet portion 108 whose interior provides a fluid inlet upstream from valve seat 93. Circumferentially spaced crimped portions 110 in the inlet 108 secure a bracket member 112 in the interior of portion 108 while still permitting refrigerant to flow between the members 112 and 108. Bracket 112 supports a threaded adjustment member 114. A nut 116 maintains member 114 in its set position. The member 114 engages one end 117 of a temperature responsive actuator 118.

Actuator 118 includes a substantially cup-shaped member 120 of rigid material whose interior is filled with water 121. The member 120 has an open end 122 which is covered by a flexible diaphragm type member 124 which encloses water 121 within the casing 120. A projection 126 on the valve element 94 engages the flexible member 124 to cause valve 94 to move upward when expanding water distorts member 124.

When frost conducive conditions are encountered in the evaporator such as when the compressor 10 is operated at relatively high speed, the refrigerant temperature in the evaporator 38 decreases. When its refrigerant temperature reaches 32°F., the water within the actuator 118 should begin to solidify. The volume of a given amount of water in the form of ice is about 10 percent greater than the volume of the same amount of water in liquid form. Thus freezing of water 121 in actuator 118 causes diaphragm 124 to be distorted and moved away from the actuator. This resultantly pushes the valve member 94 toward seat 93 of the throttling valve 44 and restricts the flow of refrigerant flowing between the evaporator and the compressor. The restriction of refrigerant flow tends to cause refrigerant to back up or collect in the evaporator to a greater extent than would be the case if valve 94 were open. This increases the refrigerant pressure and temperature in the evaporator above a freezing value which would cause frost to form on the exterior surface of the evaporator.

The thermal power element 118 which is illustrated utilizes the flexible diaphragm 124 to transmit the expansive movement of the freezing water 121 to the valve member 102. Other means, such as a piston reciprocal within a cylinder, could also be utilized. Other flexible members besides the elastic diaphragm might also be used, such as a flexible thin metal member.

While the invention described above and illustrated in the drawings is a preferred embodiment, other embodiments may be adapted.

What is claimed is as follows:

1. An automobile air conditioning system comprising: a refrigerant compressor having an inlet and an outlet; a condenser fluidly connected to the outlet of said compressor for liquefying and cooling refrigerant received therefrom; expansion means fluidly connected to said condenser for receiving refrigerant therefrom and for decreasing refrigerant pressure; an evaporator fluidly connected to said expansion means for receiving refrigerant therefrom and for vaporizing refrigerant by the absorption of heat from air passing over the exterior surface of said evaporator; a throttling valve between said evaporator and said compressor for regulating the temperature of refrigerant in said evaporator to prevent frost from forming on the evaporator's exterior surfaces; said throttling valve including a valve member located upstream from and normally spaced from a valve seat to permit refrigerant to flow from said evaporator to said compressor; a valve actuator including a rigid cup-shaped member supported upstream from said valve in continuous fluid contact with refrigerant flowing from said evaporator; extendable means attached to said cup-shaped member to enclose water within its interior and being movable away from said cup-shaped member and toward said valve seat member when water within said actuator freezes and thereby expands; means operably connecting said extendable member to said valve member to move said valve toward a closed position against said valve seat when the water in said actuator expands due to freezing whereby refrigerant collects in said evaporator to cause an increase in refrigerant pressure therein to consequently maintain refrigerant temperature above a predetermined value.

2. An automobile air conditioning system comprising: a refrigerant compressor having an inlet and an outlet; a condenser fluidly connected to the outlet of said compressor for liquefying and cooling refrigerant received therefrom; expansion means fluidly connected to said condenser for receiving refrigerant therefrom and for decreasing refrigerant pressure; an evaporator fluidly connected to said expansion means for receiving refrigerant therefrom and for vaporizing refrigerant by the absorption of heat from air passing over the exterior surface of said evaporator; a throttling valve located between said evaporator and said compressor for regulating the temperature of refrigerant in said evaporator to prevent frost forming on the evaporator's exterior surfaces; said throttling valve including tube means supported within a housing for conducting refrigerant from said evaporator to said compressor; a valve member adapted to engage a valve seat formed by the upstream end of said tube means for regulating the flow of refrigerant from said evaporator to said compressor; spring means normally spacing said valve away from said valve seat in an open position; a valve actuator including a rigid cup-shaped member supported upstream from said valve in continuous fluid contact with refrigerant flowing from said evaporator; said cup-shaped member enclosing a quantity of water within its interior and having an open end covered by a flexible diaphragm which is distorted when water within said actuator freezes and thus expands to move a midportion of said diaphragm away from said cup-shaped member and toward said valve member; means operably connecting said diaphragm to said valve member to move said valve toward a closed position against said valve seat when the water in said actuator expands due to freezing whereby refrigerant collects in said evaporator to cause refrigerant pressure to increase therein and consequently to maintain refrigerant temperature above a predetermined value.

3. An automobile air conditioning system comprising: a refrigerant compressor having an inlet and an outlet; a condenser fluidly connected to said refrigerant compressor for receiving refrigerant therefrom and for liquifying and cooling refrigerant; expansion means fluidly connected to said condenser for receiving refrigerant therefrom and for reducing refrigerant pressure; an evaporator fluidly connected to said expansion means for receiving refrigerant therefrom and for vaporizing refrigerant by the absorption of heat from air passing over the evaporator's exterior surfaces; a throttling valve between said evaporator and said compressor for regulating the temperature of refrigerant in said evaporator to prevent frost from accumulating on the evaporator's exterior surfaces; said throttling valve including a tube within a casing which forms a passage to conduct refrigerant flow from said evaporator to said compressor; said tube having an upstream end forming a valve seat; a valve member spaced from said valve seat by a spring and having its end face abutting said valve seat when in a closed operative position to interrupt the flow of refrigerant from said evaporator to said compressor; an actuator located upstream from said valve member in continuous fluid contact with refrigerant flowing from said evaporator and including a rigid cup-shaped member whose interior is completely filled with water; said cup-shaped member having an open end and with the water therein enclosed by a flexible diaphragm member which is distorted when water within said actuator freezes and consequently expands to cause a portion of said diaphragm to move away from said cup-shaped member and toward said valve member; means operably connecting said diaphragm and said valve member to cause said valve to move toward a closed position against said valve seat when water in said actuator expands due to freezing.

* * * * *